Dec. 10, 1968 — W. K. PRIESE ET AL — 3,415,488
BALL VALVE
Filed Dec. 9, 1966 — 2 Sheets-Sheet 1

Inventors
Werner K. Priese
David J. Davies
By Olson, Trexler, Wolters & Bushnell Attys.

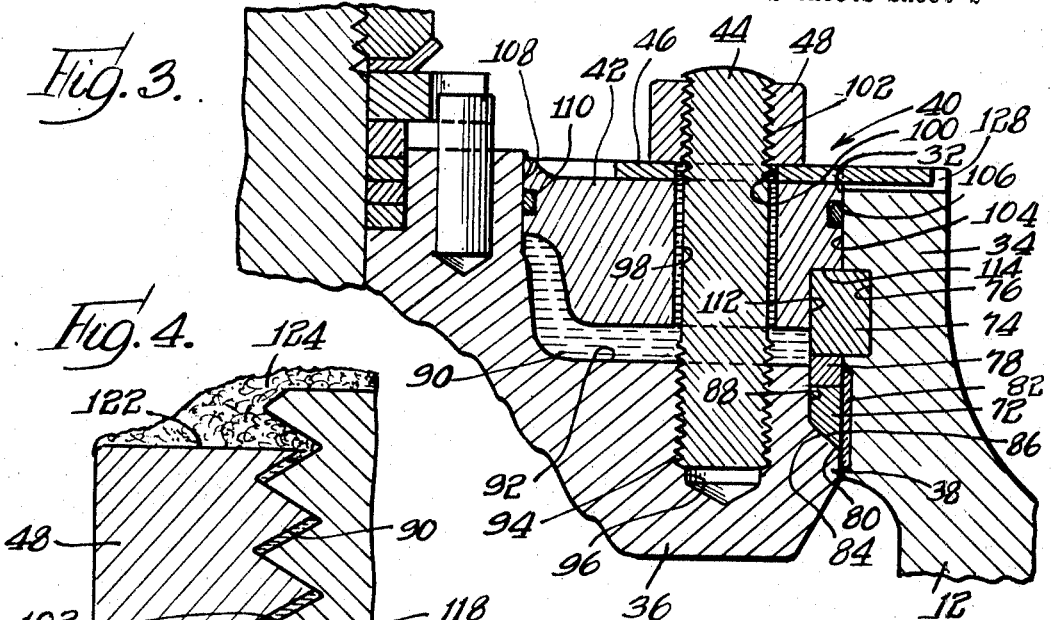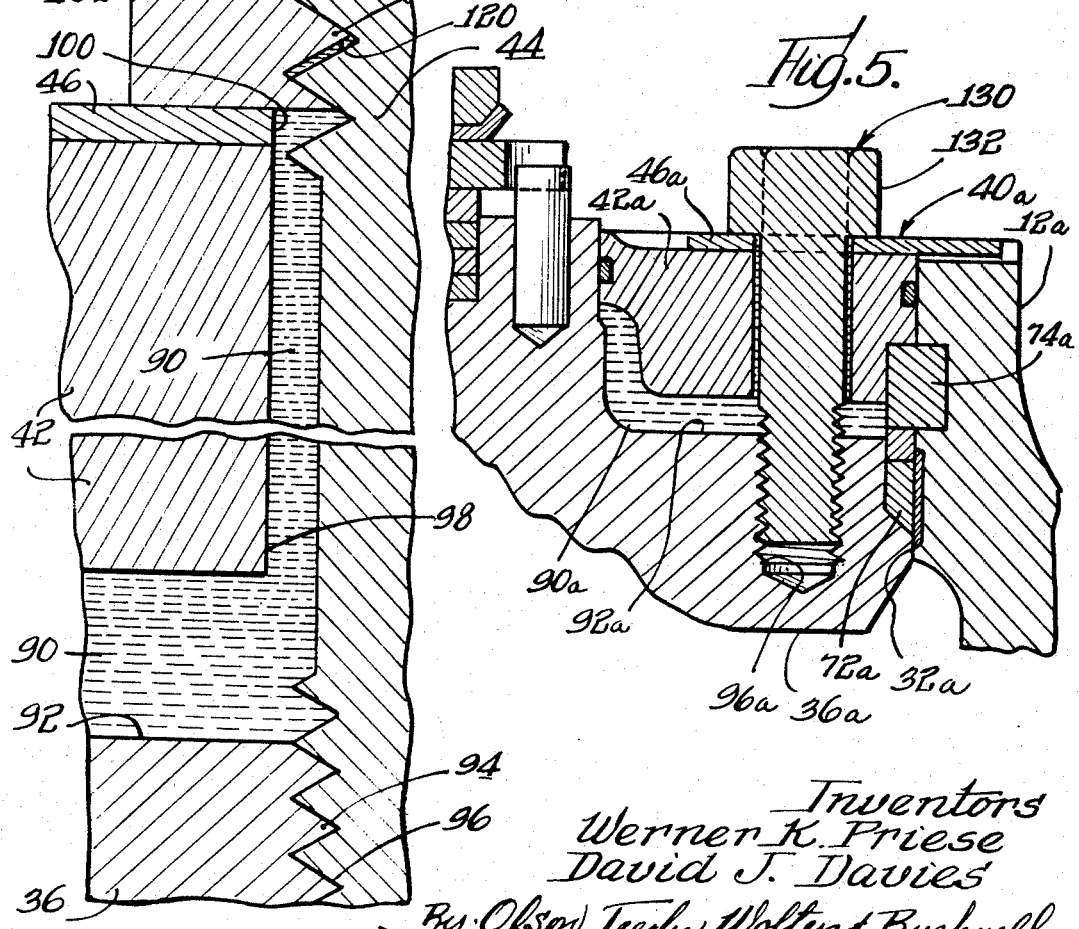

United States Patent Office 3,415,488
Patented Dec. 10, 1968

3,415,488
BALL VALVE
Werner K. Priese, Tower Lake, Barrington, and David J. Davies, Naperville, Ill., assignors to Hills-McCanna Company, Carpentersville, Ill., a corporation of Illinois
Filed Dec. 9, 1966, Ser. No. 600,548
8 Claims. (Cl. 251—315)

The present invention relates to ball valves that are "top opening" in the sense that the valve ball and various related parts can be assembled into the valve body, removed and replaced through an opening formed in the side or "top" of the valve body between principal flow passages formed in the valve body and extending into an internal pressure chamber containing the flow control ball.

The opening in the valve body through which the valve ball is admitted into and removed from the valve body is necessarily large, as a practical matter, in relation to the size of the body in order to permit ingress and egress of the ball. This large opening is normally closed by a removable bonnet. When such a valve is subjected to high internal fluid pressure, the matter of preventing the escape of fluid by leakage around the removable valve bonnet is complicated by the necessity of sealing the removable valve bonnet to the valve body against leakage while, at the same time, withstanding the outward force on the bonnet of internal valve pressure, which can become quite high as the internal fluid pressure increases.

Effective sealing against leakage around such a removable bonnet can be provided to advantage by structure utilizing very strong forces which are produced to greatest advantage by threaded elements such as screws and bolts. The threaded elements used for this purpose in such valves can afford advantages, but can be a source of troublesome service problems particularly in valves which are used in corrosive environments tending to cause severe corrosion of such threaded elements and create difficulties in disassembling valves for service.

One object of the invention is to provide a "top opening" ball valve of the above character that utilizes the outward force of internal pressure on the removable valve bonnet to increase the sealing pressure which serves to prevent leakage around the bonnet, which sealing pressure is initially established and maintained at a high value by strong outward forces applied to the bonnet in a highly efficient and advantageous manner by exposed threaded elements that are continuously maintained in a condition providing for ready disassembly of the threaded elements and removal of the bonnet even after the valve including the threaded elements have been long exposed to a corrosive environment.

Another object is to provide a ball valve of the character recited utilizing, to advantage, a bonnet sealing ring which anchors the bonnet against outward displacement by fluid pressure and which prevents the leakage of fluid past the bonnet by an effective sealing pressure that is progressively increased with increases in fluid pressure within the valve, the seal being initially established through forceful stressing and deformation of the sealing ring, such stressing and deformation of the sealing ring being effected by strong outward forces on the bonnet produced by exposed threaded elements that are effectively protected against corrosion in a new and improved manner to the end that no substantial difficulties are encountered in removing the valve bonnet even after the valve has been long exposed to a corrosive environment.

More specifically stated, a further object of the invention is to provide a ball valve as recited in the preceding objects which utilizes a charge of lubricant effectively sealed within a bonnet assembly of new and improved construction to effectively prevent "freezing" by corrosion of threaded elements used to advantage in applying powerful outward forces to the removable valve bonnet to initially establish and effectively maintain a fluid-tight seal against the escape of fluid by leakage around the bonnet.

Other objects and advantages will become apparent from the following description of the exemplary embodiment of the invention illustrated in the drawings, in which:

FIG. 3 is a fragmentary sectional view on an enlarged scale, taken with reference to line 3—3 of FIG. 2, and showing components of the assembly used to support and seal the bonnet with respect to the valve body;

FIG. 4 is a fragmentary sectional view on a greatly enlarged scale showing a portion of one threaded element and adjacent parts as illustrated in FIG. 3; and FIG. 5 is a fragmentary sectional view similar to FIG. 3, but illustrating a construction modified by the use of a different threaded element.

Figure 1:
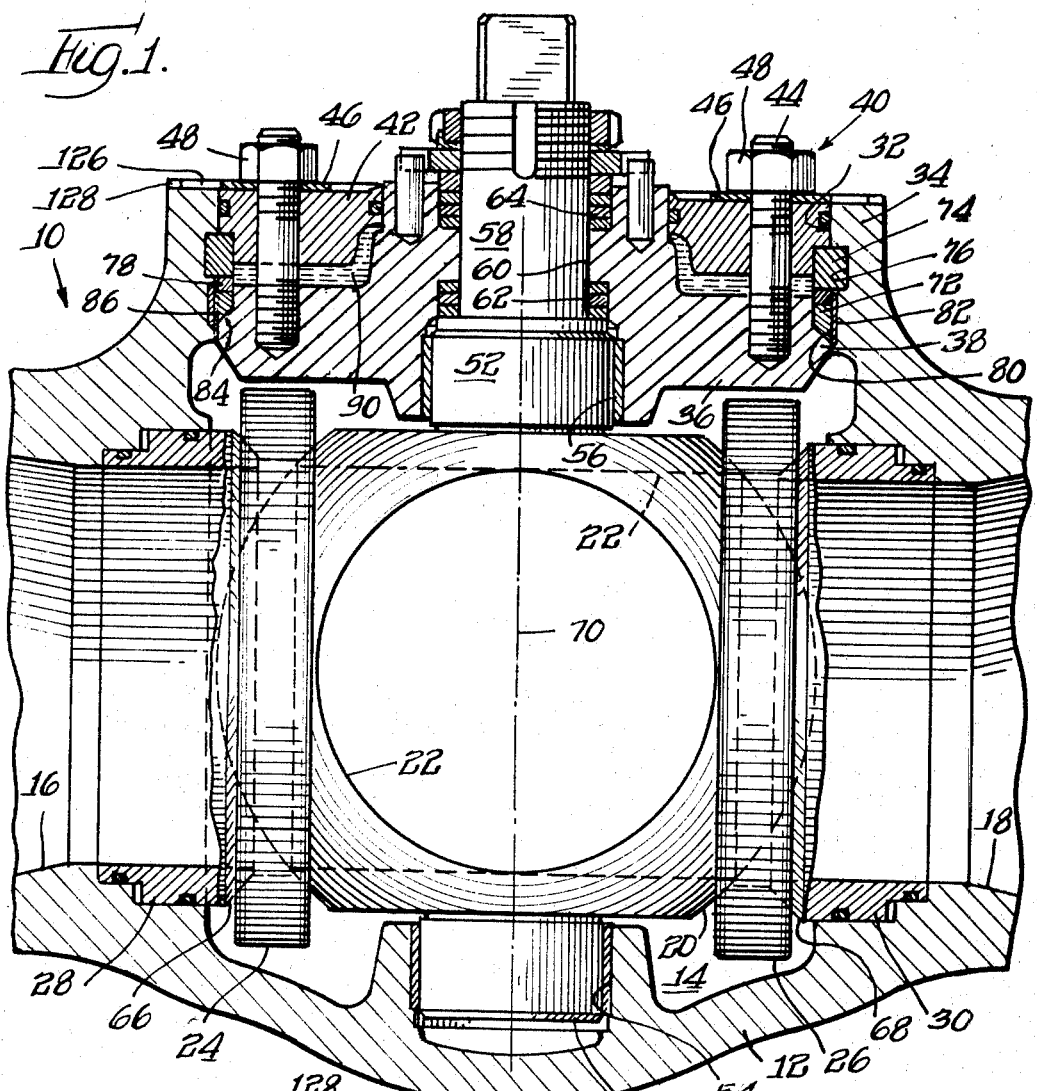
FIGURE 1 is a longitudinal sectional view of a ball valve embodying the invention.

Referring to the drawings in greater detail, the ball valve 10 forming the exemplary embodiment of the invention illustrated, FIGS. 1 to 4, is inherently well adapted to control the flow of fluids under high pressure. The valve comprises a valve body 12 defining an internal valve chamber 14 and two flow passages 16, 18 opening into opposite ends of the chamber 14, A flow control ball 20 defining a flow bore 22 therein is rotatably disposed within said chamber 14 for rotation between a closed valve position, illustrated in FIG. 1, in which the ball bore 22 is turned away from the passages 16, 18, and an open valve position in which said bore 22 is aligned with said passages 16, 18 as indicated by dotted lines in FIG. 1. Two annular valve seats 24, 26 supported respectively on two seat support elements 28, 30 encircle the inner ends of the respective passages 16, 18 and slidably engage the ball 20 to form a seal against the passage of fluid through the valve when the ball is turned to its closed valve position. As illustrated, the annular seat support elements 28, 30 define the inner ends of the respective passages 16, 18 and are supported on the main structure of the body 12 to constitute, in effect, components of the valve body 12.

The ball valve 10 is "top opening" in the sense that the ball 20 and other removable internal parts of the valve can be removed for servicing through the "top" of the valve body and replaced without disconnecting the valve body 12 from coacting conduits (not shown) connected with the flow passages 16, 18. The fact that the ball and other internal parts of a "top opening" valve can be removed from the valve body for servicing without the necessity of disconnecting the valve body from the coacting conduit system in which it is installed is regarded as being highly advantageous in providing for servicing of such a valve while avoiding the expense in time and effort which would be involved in removing and replacing the valve body with reference to the conduit system in which it is used.

Having reference to the valve 10 of FIG. 1, the ball 20 is initially admitted into the chamber 14 and subsequently removed from the valve body (if necessary) and replaced through a circular bonnet well or opening 32 formed in the lateral side or "top" of the valve body between the passages 16, 18 and opening outwardly from the internal chamber 14.

Figure 2:
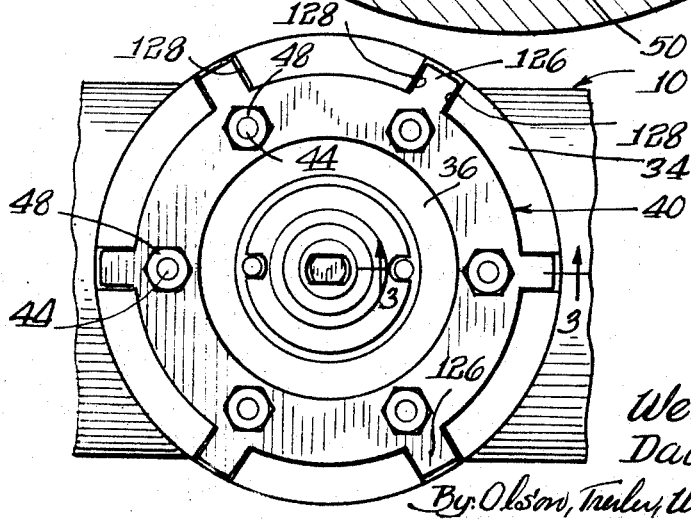
FIG. 2 is a top plan view of the valve of FIG. 1.

In the preferred construction illustrated, the circular well 32 is encircled and defined by an annular well defining portion 34 of the body 12 extending a short distance outwardly from the chamber 14 in concentric relation to the well 32, as illustrated in FIGS. 1 and 2. By virtue of the construction to be described, the radial thickness of the annular well defining portion 34 of the valve body can be substantially limited to that required to provide strength sufficient to sustain with assurance the outward forces of internal fluid pressure on the valve.

The outwardly open well 32 is normally closed by a removable bonnet 36 having a circular outer periphery 38 dimensioned to fit down into the well 32, as shown in FIG. 1.

As will presently appear, the bonnet 36 is a part of a removable bonnet assembly, denoted generally by the number 40, that includes, in addition to the bonnet, an annular base ring 42, a plurality of circumferentially spaced studs 44, an annular washer 46, and nuts 48 threaded onto the studs 44, all as will be described presently in detail.

The ball 20 is journaled in the chamber 14 by means of two trunnions 50, 52 extending respectively into a support bearing 54 on the body 12 and a support bearing 56 mounted in the bonnet 36 in coaxial relation to the circular bonnet. The ball 20 is turned between its open and closed valve positions by means of a control stem 58 which, as shown, is formed integrally with the upper trunnion 52 and extends outwardly through a central bore 60 in the bonnet 36. The escape of fluid along the control stem 58 is prevented by an inner stem seal 62 and an outer stem seal 64 supported by the bonnet in encircling relation to the control stem as shown.

In the valve 10 illustrated, the annular valve seats 24, 26 are supported by annular support surfaces 66, 68 of convex spherical curvature which facilitates movement of the seats to accommodate vertical displacement of the ball 20 along the axis 70 of the trunnions 52, 54 and assembly and disassembly of the ball with reference to the body 12 by movement of the ball along the trunnion axis 70.

The circular bonnet 36 is effectively sealed to the annular well defining portion 34 of the valve body 12 by a bonnet sealing ring 72 which sustains the full outward force of internal fluid pressure on the removable bonnet in such manner that the effectiveness of the seal formed between the removable bonnet and the well defining portion 34 of the body is increased progressively as the fluid pressure within the valve chamber 14 increases.

The annular bonnet sealing ring 72 is positively and firmly anchored against outward displacement by means of an anchor ring 74 removably disposed within a circular anchor groove 76 formed in the well defining portion 34 of the valve body and opening radially inward. The anchor ring 74 is contractable in diameter for insertion down through the outer end of the well 32 into a position of axial alignment with the groove 76 where the anchor ring is allowed to expand into the anchor groove. The anchor ring 74, which is formed of a strong resilient metal, is dimensioned radially to project radially inward from the groove 76 so that the inner portion of the anchor ring forms a circular anchoring abutment. In the preferred construction illustrated, an annular gland 78 is disposed between the inwardly projecting portion of the removable anchor ring 74 and the axially outer side or face of the bonnet sealing ring 72 to positively support the bonnet sealing ring against axially outward displacement.

The bonnet sealing ring 72 is formed of a material which is relatively soft in relation to the hardness of the material from which the bonnet 36 is constructed. A most suitable material for forming the bonnet sealing ring 72 in a high pressure valve is soft iron.

The bonnet sealing ring 72 is encircled by a cylindrical fluid sealing surface 80 defined by the annular well defining portion 34 of the valve body 12 and forming a part of the well 32. To preclude any possibility of deformation of the cylindrical sealing surface 80 against which the bonnet sealing ring 72 is radially tightened in a manner to be described, the cylindrical surface 80 is preferably formed of a very hard material such, for example, as a layer of Stellite 82 bonded to the encircling structure of the valve body 12 and suitably finished to define the sealing surface 80 which has an axial extent at least equal to that of the bonnet sealing ring.

The bonnet sealing ring 72 is swelled or expanded radially into firm sealing engagement with the encircling sealing surface 80 as a consequence of applying axially outward force to the bonnet 36.

With reference to the construction illustrated, the axially inward side of the bonnet sealing ring 72 is shaped to form a seal expanding face 84 of truncated conical shape diverging in diameter in an inward direction. This seal expanding face 84 of the bonnet sealing ring is confronted by a similarly shaped seal expanding annular cam 86, of inwardly diverging conical shape, formed on the bonnet 36 adjacent its circular outer periphery 38 as shown. The bonnet sealing ring 72 is radially supported on its inward side by the seal expanding cam 86 and by a cylindrical surface 88 formed on the bonnet 36 and extending axially outward from the cam 86 as shown most clearly in FIG. 3.

As will presently appear, the bonnet sealing ring 72 is loaded compressively between an annular seal pressure applying element formed by the gland 78 and an annular seal pressure applying element formed by the cam 86.

To initially establish and permanently maintain an effective seal between the bonnet 36 and the sealing surface 80 on the valve body 12, the bonnet 36 is subjected to an axially outward force of sufficient magnitude to cause the annular cam 86 to expand the seal 72 and deform the seal, as may be necessary, to produce a fluid-tight seal between the sealing ring 72 and the encircling surface 80 and between the seal 72 and the adjacent supporting portion of the bonnet 36.

The outward axial force which must be applied to the bonnet 36 for this purpose can be considerable, as when the sealing ring 72 is formed of soft iron or other metals requiring substantial sealing pressures in order to operate with optimum effectiveness.

The required outward axial force can be applied to the bonnet 36 to greatest advantage by means of threaded elements which afford excellent mechanical advantage in applying the desired stress to the bonnet sealing ring 72.

Because of the twofold necessity of minimizing manufacturing costs and making the threaded elements used for this purpose readily accessible, the threaded elements are exposed to the external environment which is corrosive to a degree which can be severe.

As will presently appear, the threaded elements used to apply a powerful outward force to the bonnet 36 are protected effectively against troublesome corrosion by a charge of lubricant 90 contained in the bonnet assembly 40.

The lubricant 90 can be any of many good quailty soft greases which are commercially available. The grease is packed into an annular grease or lubricant space 92 which is traversed by the medial portions of a plurality of threaded elements used in applying an outward force to the bonnet 36. As shown in FIGS. 1, 2 and 3, the threaded elements comprise the previously mentioned studs 44. As illustrated in FIG. 3, the inner end of each stud 44 has fine stud threads 94 which are threaded into a threaded hole 96 formed in the bonnet 36 in proximate relation to the outer periphery of the bonnet and closed at its inner end.

The studs 44, six in number in this instance, are circumferentially spaced around the bonnet 36 and extend axially outward through a corresponding number of stud holes 98 formed in the previously mentioned annular base ring 42. The outer ends of the studs 44 are threaded with threads 102, FIG. 3, and project out through stud apertures 100 in the annular washer 46 which fits flat against the outer face of the base ring 42. Nuts 48 are threaded onto the outer ends of the studs 44 to react inwardly against the washer 46.

The threads 102 on the outer end of each stud 44 are made relatively coarse and loose fitting in relation to the coacting threaded nut 48 as compared to the relatively fine and tight fitting threads 94 by which the inner end of the stud is threaded into the bonnet 36. The purpose of this is to provide for loosening of the nut 48 on the stud by a torque that normally is much less than that required to unscrew the stud from the bonnet.

The outer periphery of the base ring 42, FIG. 3, is encircled by a first lubricant sealing surface 104 of cylindrical shape formed on the well defining portion 34 of the valve body and extending axially outward from the anchor groove 76. An O-ring seal 106 fitted in the outer periphery of the base ring 42 engages the lubricant sealing surface 104 to effectively bar the escape of lubricant between the surface 104 and the base ring.

The inner periphery of the base ring 42 encircles a second lubricant sealing surface 108 formed on the bonnet 36 in axial proximity to the first lubricant sealing surface 104, as shown in FIG. 3, and having a diameter substantially smaller than that of the lubricant sealing surface 104. An O-ring seal 110 fitted in the inner periphery of the base ring 42 engages the inner sealing surface 108 to prevent the escape of lubricant around the inner periphery of the base ring.

At its outer periphery, the base ring 42 is shaped by an annular notch 112 which allows the base ring to extend somewhat inwardly of the axially outward face of the anchor ring 74 and which forms an annular abutment 114 on the base ring which engages the axially outward face of the anchor ring 74 to transmit axially inward force from the base ring 42 to the anchor ring 74.

The previously mentioned annular lubricant space 92 into which the charge of lubricant or grease 90 is placed is defined between the base ring 42 and the annular portion of the bonnet 36 located axially inward of the base ring 42. For this purpose, the axially inward extent of the base ring 42 is limited in relation to the position of the abutment 114, and the outward extent of the annular portion of the bonnet 36 located axially inward of the base ring 42 is limited in relation to the position of the seal expanding cam 86 as determined by the seal 72, gland 78 and anchor ring 74.

As previously indicated, the medial portion of each stud 44 passes through the lubricant space 92 where the stud comes into direct contact with the main charge of lubricant 90 placed in the space 92. The lubricant 90 completely covers the portion of each stud 44 entering the coacting stud bore 96 in the bonnet 36 and completely shields the inner stud threads 94 threaded into the stud bore 96 from the corrosive conditions of the external environment.

At the same time, the lubricant or grease 90 moves out through the stud holes 98 and stud apertures 100 in the base ring 42 and washer 46 to progress along the respective studs 44 to the inner faces of the nuts 48 resting against the washer 46. The manner in which the lubricant 90 moves out along a typical stud 44 to the coacting nut 48 is best illustrated in FIG. 4. Having reference to FIG. 4, the reference number 118 is used to denote the internal thread of a typical nut 48 which engages and reacts outwardly against the relatively coarse outer thread 102 of the coacting stud 44. The grease or lubricant 90 moving outwardly along the stud 44 to the nut 48 progresses by capillary action through a helical interstice 120 between the mutually engaged threads 118, 102 of the nut 48 and stud 44 to provide a protective film of lubricant which spreads between the coacting nut and stud threads substantially to the axially outer face 122 of the typical nut 48.

The outwardly exposed surfaces of the nuts 48 and the ends of the studs 44 extending beyond the nuts 48 are exposed to corrosion by the external environment. Corrosive material on the outer face of the typical nut 48 and the adjacent, projecting end of the coacting stud 44 is illustrated schematically in FIG. 4 and identified by the reference number 124.

Because of the protective film of lubricant rising by capillary action through the mutually engaged threads of the typical nut 48 and stud 44 from the internal charge of lubricant 90, the nut is effectively protected against being "frozen" to the stud by corrosion. Corrosion of the mutually engaged nut and stud threads is substantially prevented, being confined normally to a very small portion of the mutually engaged nut and stud threads located near the outer face 122 of the typical nut 48 with reference to FIG. 4.

After the valve parts are assembled together in the manner described, the studs 44 having been previously tightened or set in the bonnet 36, the nuts 48 are tightened to provide the desired high order of outward axial force to the bonnet 36. The tightened nuts 48 react inwardly through the washer 46 and base ring 42 on the anchor ring 74, that is compressed between the base ring 42 and the annular gland 78 which reacts inwardly on the bonnet sealing ring 72 to hold the sealing ring 72 against outward displacement.

At the same time, the tightened nuts 48 react outwardly through the studs 44 on the bonnet 36 to force the seal expanding cam 86 axially outward against the seal expanding face 84 of the bonnet sealing ring 72 to expand the latter against the fluid sealing surface 80 to the degree necessary to provide and assure a highly effective sealing of the valve against the outward leakage of fluid around the bonnet.

In the event it becomes desirable later to remove the valve ball 20 and other removable internal parts of the valve from the body 12, the nuts 48 are loosened with a suitable wrench. On account of the protection of the mutually engaged threads 118 and 102 of the nuts and studs by the internal charge of lubricant 90 in the valve assembly 40 in the manner described, significant resistance to loosening of the nuts due to corrosion is effectively prevented, even though the valve may have been in service for a protracted period of time in a corrosive environment.

In the unlikely event that excessive resistance to loosening of the nuts 48 on the studs 44 should be encountered due to abuse of the stud threads or any other reason, disassembly of the valve is still no problem for the reason that torque applied to any particular nut 48 becomes effective to unthread the inner end of the coacting stud 44 from the bonnet 36, the fine threads 94 on the inner end of the stud being continuously protected mechanically by the base ring 42 and being protected chemically by the internal charge of lubricant 90 surrounding and coating the medial portion of the stud.

It will be appreciated that after removal of the nuts 48 and removal of any particular stud 44, in the unlikely event that the latter becomes necessary, the washer 46 and base ring 42 are removed providing access to the contractible anchor ring 74 which is contracted and removed from the anchor groove 76, thus providing clearance for easy axial extraction of the bonnet 36 together with the bonnet seal 72 and gland 78 from the well 32.

As shown in FIGS. 1, 2 and 3, a plurality of anchoring lugs 126 integral with the washer 46 extend radially outward from the periphery of the washer into interferring relation with a plurality of abutments 128 formed on the well defining portion 34 of the body 12 and coacting with the anchoring lugs to hold the washer 46 and hence the bonnet 36 against rotation upon turning of the control stem 58 in the bonnet to open and close the valve.

In the modified construction illustrated in FIG. 5, component elements forming counterparts of the construction previously described in relation to FIG. 3 are identified with the same reference number but with the addition of the suffix "a".

As shown in FIG. 5, the studs 44 and nut 48 previously described in relation to FIG. 3 can be replaced, if desired, with cap screws, a typical one of which is illustrated in FIG. 5 and identified by the reference number 130. The outer head 132 of the typical cap screw 130 is nut shaped for engagement and rotation by a wrench and fits against the washer 46a. The inner end of the cap screw 130 is threaded into a coacting bore 96a in the bonnet 36a as shown. Removal of the cap screws 130 permits removal of the bonnet assembly 40a from the well 32a in the valve body 12a.

The invention is claimed as follows:

1. A high pressure ball valve adapted to be disassembled with ease and reassembled after long exposure to a corrosive atmosphere and comprising, in combination, a valve body defining an internal valve chamber and two flow passages opening into said chamber, a flow control ball defining a flow bore therein and being rotatably disposed within said chamber, valve seat means supported on said valve body in encircling relation to one of said flow passages and slidably engaging said ball to form a seal therewith, said valve body including an annular portion defining between said flow passages a circular bonnet well opening outwardly from said chamber and having a minimum diameter which is at least equal to the diameter of said ball to permit passage of said ball through said well into and out of said chamber, said well being defined in part by a high pressure sealing surface of cylindrical form on said annular body portion, a valve bonnet removably disposed in said bonnet well and having a generally circular periphery fitting into the well and having a diameter limited to that of the well, a bonnet sealing ring encircling said bonnet and being closely encircled by said high pressure sealing surface, said bonnet sealing ring defining on the axially inward side thereof a seal expanding face of inwardly diverging truncated conical shape, said bonnet defining a seal tightening cam of inwardly diverging truncated conical shape confronting and fitting against said seal expanding face on said bonnet sealing ring, said annular well defining portion of said body having therein an annular anchor groove opening radially inward on the axially outward side of said high pressure sealing surface, an anchor ring contractible in diameter and being removably disposed in said anchor groove and projecting radially inward in relation to said high pressure sealing surface, an annular gland disposed between said anchor ring and the axially outward side of said bonnet sealing ring to anchor the latter against axially outward displacement, said annular well defining portion of said body defining a first lubricant sealing surface of concave cylindrical form extending axially outward from said anchor groove and defining a portion of said well, said bonnet defining a second lubricant sealing surface of convex cylindrical form disposed in axially proximate relation to said first lubricant sealing surface and having a diameter much less than that of said first lubricant sealing surface, an outer base ring of annular form dimensioned and shaped to extend removably into said well in encircling relation to said bonnet and fit firmly against said anchor ring, said outer base ring having an outer periphery of circular form closely encircled by said first lubricant sealing surface on said body and having an inner periphery of circular form closely encircling said second lubricant sealing surface on said bonnet, a first O-ring seal forming a lubricant seal between said base ring outer periphery and said first lubricant sealing surface, a second O-ring seal forming a seal between the inner periphery of said base ring and said second lubricant sealing surface on said bonnet, said base ring defining therein a plurality of circumferentially spaced stud holes extending axially therethrough, an annular washer disposed in overlying engagement with said base ring and defining a plurality of stud apertures therein aligned with said respective stud holes in said base ring, a plurality of circumferentially spaced studs threaded into said bonnet inwardly of said base ring and extending axially outward through said respective stud holes in said base ring and through said respective stud apertures in said washer, threads on the outer ends of said studs, a plurality of nuts threaded onto the outer ends of said respective studs to react inwardly through said washer and said base ring on said anchor ring and to react outwardly through said studs on said bonnet to urge said seal tightening cam on said bonnet axially outward against said seal expanding face on said bonnet sealing ring to swell said bonnet sealing ring radially against said high pressure sealing surface on said body to produce a high intensity sealing engagement of said bonnet sealing ring with said sealing surface and a high intensity sealing engagement of said bonnet sealing ring with said bonnet which are intensified by the force of fluid pressure within said chamber acting axially outward on said bonnet, said base ring and the annular portion of said bonnet disposed axially inward of said base ring being shaped and positioned in relation to each other and to said anchor ring to define therebetween when said nuts are tightened on said studs an annular lubricant space disposed inwardly of said first and second O-ring seals on said base ring and outwardly of said bonnet sealing ring, a charge of lubricant disposed within said lubricant space, said lubricant space containing said charge of lubricant being positioned with respect to said studs so that said studs extend outwardly through said lubricant space in contact with lubricant therein which is free to move inwardly along the studs to continuously lubricate the threaded inner ends thereof and which lubricant is free to move outwardly along said studs through said base ring and said washer to said nuts to provide lasting lubrication to mutually engaged threads on said nuts and said studs by capillary movement of the lubricant outwardly between the threads on the studs and adjacent threads on said nuts, a control stem connected in rotary driving relation to said ball and extending outwardly through said bonnet, sealing means forming a seal between said bonnet and said control stem, said washer defining thereon a plurality of circumferentially spaced anchoring lugs extending radially outward, said well defining portion of said body defining a plurality of abutments coacting with said washer anchoring lugs to anchor said washer and said bonnet against rotation upon turning of said control stem to open and close the valve.

2. A high pressure ball valve adapted to be disassembled with ease and reassembled after long exposure to a corrosive atmosphere and comprising, in combination, a valve body defining an internal valve chamber and two flow passages opening into said chamber, a flow control ball defining a flow bore therein and being rotatably disposed within said chamber, valve seat means on said valve body encircling one of said flow passages and slidably engaging said ball to form a seal therewith, said valve body including an annular portion defining between said flow passages a circular bonnet well opening outwardly from said chamber and having a minimum diameter which is at least equal to the diameter of said ball to permit passage of said ball through said well into and out of said chamber, said annular well defining portion of the body having thereon a high pressure sealing surface of cylindrical shape defining a portion of said well, a valve bonnet removably disposed in said bonnet well and having a generally circular periphery fitting into the well, a bonnet sealing ring encircling said bonnet and being closely encircled by said high pressure sealing surface, said bonnet sealing ring defining on the axially inward side thereof a seal expanding face of inwardly diverging truncated conical shape, said bonnet defining a seal tightening cam of inwardly diverging truncated conical shape confronting and fitting against said seal expanding face on said bonnet sealing ring, said annular well defining portion of said body having therein an annular anchor groove opening radially inward on the axially outward side of said high pressure sealing surface, an anchor ring contractible in diameter and being removably disposed in said anchor groove and projecting radially inward in relation to said high pressure sealing surface to positively anchor said bonnet sealing ring against outward displacement, an outer base ring of annular form dimensioned and shaped to extend removably into said well on the outward side of said bonnet and fit firmly against said anchor ring to transmit inward force to the latter, means forming a peripheral seal between the outer periphery of said base ring and said annular well defining portion of said body, means forming a peripheral seal between the inner periphery of said base ring and said bonnet, said base ring defining therein a plurality of circumferentially spaced stud holes extending axially therethrough, a plurality of circumferentially spaced studs threaded into said bonnet inwardly of said base ring and extending axially outward through said respective stud holes in said base ring, threads on the outer ends of said studs, a plurality of nuts threaded onto the outer ends of said respective studs to react inwardly through said base ring on said anchor ring and to react outwardly through said studs on said bonnet to urge said seal tightening cam on said bonnet axially outward against said seal expanding face on said bonnet sealing ring to swell said bonnet sealing ring radially against said high pressure sealing surface on said body to produce a high intensity sealing engagement of said bonnet sealing ring with said sealing surface and a high intensity sealing engagement of said bonnet sealing ring with said bonnet which are intensified by the force of fluid pressure within said chamber acting axially outward on said bonnet, said base ring and the annular portion of said bonnet disposed axially inward of said base ring being shaped and positioned in relation to each other and to said anchor ring to define therebetween when said nuts are tightened on said studs an annular lubricant space through which said studs extend, a charge of lubricant disposed within said lubricant space in contact with medial portions of said studs to continuously lubricate the threaded portions of the studs entering said bonnet and to move outwardly along said studs through said base ring to said nuts to provide lasting lubrication to mutually engaged threads on said nuts and said studs by capillary movement of the lubricant outwardly between threads on the studs and adjacent threads on said nuts, a control stem connected in rotary driving relation to said ball and extending outwardly through said bonnet, sealing means forming a seal between said bonnet and said control stem, and means for holding said bonnet against rotation upon turning of said control stem to open and close the valve.

3. A high pressure ball valve adapted to be disassembled with ease and reassembled after long exposure to a corrosive atmosphere and comprising, in combination, a valve body defining an internal valve chamber and two flow passages opening into said chamber, a flow control ball defining a flow bore therein and being rotatably disposed within said chamber, valve seat means forming a seal between said ball and a portion of said body encircling one of said flow passages, means for rotating said ball between closed valve and open valve positions thereof, said valve body defining between said flow passages a bonnet well opening outwardly from said chamber and being sufficiently large to permit passage of said ball through said well into and out of said chamber, said well being defined in part by a high pressure sealing surface on said body, a valve bonnet removably disposed in said well and having a periphery fitting into the well, a bonnet sealing ring encircling said bonnet and being closely encircled by said high pressure sealing surface, an anchor ring removably supported on said body in encircling relation to said bonnet and being located axially on the side of said bonnet sealing ring opposite from said chamber, first annular seal pressure applying means supported by said anchor ring and engaging the axially outward side of said bonnet sealing ring to hold the latter against outward displacement, second annular seal pressure applying means supported by said bonnet and engaging the axially inward side of said bonnet sealing ring to transmit to the latter axially outward force on said bonnet, one of said first and second seal pressure applying means defining a seal expanding cam of truncated conical shape diverging away from said bonnet sealing ring to expand said bonnet sealing ring radially against said high pressure sealing surface as an incident to compressive loading of said bonnet sealing ring between said first and second seal pressure applying means, an outer base ring of annular form supported rigidly on said body in encircling relation to said bonnet on the outward side thereof, means forming a peripheral seal between the outer periphery of said base ring and said body, means forming a peripheral seal between the inner periphery of said base ring and said bonnet, said base ring defining therein a plurality of circumferentially spaced stud holes extending axially therethrough, a plurality of circumferentially spaced studs threaded into said bonnet inwardly of said base ring and extending axially outward through said respective stud holes in said base ring, threads on the outer ends of said studs, a plurality of nuts threaded onto the outer ends of said respective studs to react inwardly through said base ring on said body and to react outwardly through said studs on said bonnet to force said seal tightening cam axially against said bonnet sealing ring to swell said bonnet sealing ring radially against said high pressure sealing surface on said body to produce a high intensity sealing engagement of said bonnet sealing ring with said sealing surface and a high intensity sealing engagement of said bonnet sealing ring with said bonnet which are intensified by the force of fluid pressure within said chamber acting axially outward on said bonnet; said base ring and the annular portion of said bonnet disposed axially inward of said base ring being shaped and positioned in relation to each other to define therebetween, when said nuts are tightened on said studs, an annular lubricant space through which said studs extend; and a charge of lubricant disposed within said lubricant space in contact with medial portions of said studs to continuously lubricate the threaded portions of the studs entering the bonnet and to move outwardly along said studs through said base ring to said nuts to provide lasting lubrication to mutually engaged threads on said nuts and said studs by capillary movement of the lubricant outwardly between the threads on the studs and adjacent threads on said nuts.

4. A high pressure ball valve adapted to be disassembled with ease and reassembled after long exposure to a corrosive atmosphere and comprising, in combination, a valve body defining an internal valve chamber and two flow passages opening into said chamber, a flow control ball defining a flow bore therein and being rotatably disposed within said chamber, valve seat means forming a seal between said ball and a portion of said body encircling one of said flow passages, means for rotating said ball between closed valve and open valve positions thereof, said valve body defining between said flow passages a bonnet well opening outwardly from said chamber and being sufficiently large to permit passage of said ball through said well into and out of said chamber, said well being defined in part by a high pressure sealing surface on said body, a valve bonnet removably disposed in said well and having a periphery fitting into the well, a bonnet sealing ring encircling said bonnet and being closely encircled by said high pressure sealing surface, an anchor ring removably supported on said body in encircling relation to said bonnet and being located axially on the side of said bonnet sealing ring opposite from said chamber, first annular seal pressure applying means supported by said anchor ring and engaging the axially outward side of said bonnet sealing ring to hold the latter against outward displacement, second annular seal pressure applying means supported by said bonnet and engaging the axially inward side of said bonnet sealing ring to transmit to the latter axially outward force applied to said bonnet, one of said first and second seal pressure applying means defining a seal expanding cam of truncated conical shape diverging away from said bonnet sealing ring to expand said bonnet sealing ring radially against said high pressure sealing surface as an incident to compressive loading of said bonnet sealing ring between said first and second seal pressure applying means, an outer base ring supported on said body in encircling relation to said bonnet on the outward side thereof, means forming a peripheral seal between the outer periphery of said base ring and said body, means forming a peripheral seal between the inner periphery of said base ring and said bonnet, said base ring defining therein a plurality of circumferentially spaced holes extending therethrough, a plurality of circumferentially spaced threaded tension elements extending through said respective holes in said base ring and having on the outer ends thereof means coacting with said base ring to react inwardly thereon upon tensioning of said threaded tension elements, said threaded tension elements being threaded into said bonnet to react outwardly thereon to force said seal tightening cam axially against said bonnet sealing ring to swell said bonnet sealing ring radially against said high pressure sealing surface on said body to produce a high intensity sealing engagement of said bonnet sealing ring with said sealing surface and a high intensity sealing engagement of said bonnet sealing ring with said bonnet which are intensified by the force of fluid pressure within said chamber acting outward on said bonnet; said base ring and the portion of said bonnet disposed axially inward of said base ring being shaped and positioned in relation to each other to define therebetween, when said threaded tension elements are under tension, lubricant space through which said threaded tension elements extend; and a charge of lubricant disposed within said lubricant space in contact with medial portions of said threaded tension elements to continuously lubricate the threaded portions of the threaded elements entering the bonnet.

5. A high pressure ball valve according to claim 4 in which said threaded tension elements constitute cap screws that are tensioned by being threaded deeper into said bonnet.

6. A high pressure ball valve according to claim 4 in which said tension elements constitute studs and said means on the outer ends of the tension elements constitute nuts threaded onto the outer ends of the studs to tension the latter and to react inwardly on said base ring.

7. A high pressure ball valve adapted to be disassembled with ease and reassembled after long exposure to a corrosive atmosphere and comprising, in combination, a valve body defining an internal valve chamber and two flow passages opening into said chamber, a flow control ball defining a flow bore therein and being rotatably disposed within said chamber, valve seat means forming a seal between said ball and a portion of said body encircling one of said flow passages, means for rotating said ball between closed valve and open valve positions thereof, said valve body defining between said flow passages a bonnet well opening outwardly from said chamber and being sufficiently large to permit passage of said ball through said well into and out of said chamber, said well being defined in part by a high pressure sealing surface on said body, a valve bonnet removably disposed in said well and having a periphery fitting into the well, a bonnet sealing ring encircling said bonnet and being closely encircled by said high pressure sealing surface, an anchor ring removably supported on said body in encircling relation to said bonnet and being located axially on the side of said bonnet sealing ring opposite from said chamber, first annular seal pressure applying means supported by said anchor ring and engaging the axially outward side of said bonnet sealing ring to hold the latter against outward displacement, second annular seal pressure applying means supported by said bonnet and engaging the axially inward side of said bonnet sealing ring to transmit to the latter axially outward force applied to said bonnet, one of said first and second seal pressure applying means defining a seal expanding cam of truncated generally conical shape diverging away from said bonnet sealing ring to expand said bonnet sealing ring radially against said high pressure sealing surface as an incident to compressive loading of said bonnet sealing ring between said first and second seal pressure applying means, base means disposed on the outer side of said bonnet and coacting with said anchor ring to react inwardly thereon, said base means defining therein a plurality of holes extending therethrough and being spaced around the bonnet, a plurality of threaded tension elements extending through said respective holes in said base means and having on the outer ends thereof means coacting with said base means to react inwardly thereon upon tensioning of said threaded tension elements, said threaded tension elements being threaded into said bonnet to react outwardly thereon to force said seal tightening cam axially against said bonnet sealing ring to swell said bonnet sealing ring radially against said high pressure sealing surface on said body to produce a high intensity sealing engagement of said bonnet sealing ring with said sealing surface and a high intensity sealing engagement of said bonnet sealing ring with said bonnet which are intensified by the force of fluid pressure within said chamber acting outward on said bonnet; said base means and said bonnet being shaped and positioned in relation to each other to define therebetween, when said threaded tension elements are under tension, lubricant space through which said threaded tension elements extend, a charge of lubricant disposed within said lubricant space in contact with medial portions of said threaded tension elements to continuously lubricate the threaded portions of the threaded elements entering the bonnet, and means coacting with said base means to seal off said lubricant space from the external environment.

8. A high pressure ball valve adapted to be disassembled with ease and reassembled after long exposure to a corrosive atmosphere and comprising, in combination, a valve body defining an internal valve chamber and two flow passages opening into said chamber, a flow control ball defining a flow bore therein and being rotatably disposed within said chamber, valve seat means forming a seal between said ball and a portion of said body encircling one of said flow passages, means for rotating said ball between closed valve and open valve positions thereof, said valve body defining between said flow passages a bonnet well opening outwardly from said chamber and being sufficiently large to permit passage of said ball through said well into and out of said chamber, said well being defined in part by a high pressure sealing surface on said body, a valve bonnet removably disposed in said well and having a periphery fitting into the well, a bonnet sealing ring encircling said bonnet and being closely encircled by said high pressure sealing surface, first annular seal pressure applying means removably supported on said body and engaging the axially outward side of said bonnet sealing ring to hold the latter against outward displacement, said bonnet including second annular seal pressure applying means supported by the bonnet in engagement with the axially inward side of said bonnet sealing ring to transmit to the latter axially outward force applied to said bonnet, one of said first and second seal pressure applying means defining a seal expanding cam of truncated generally conical shape diverging away from said bonnet sealing ring to expand said bonnet sealing ring radially against said high pressure sealing surface as an incident to compressive loading of said bonnet sealing ring between said first and second seal pressure applying means, base means disposed on the outer side of said bonnet and coacting with said first annular seal pressure applying means to react inwardly thereon, said base means defining therein a plurality of holes extending therethrough and being spaced around the bonnet, a plurality of studs anchored to said bonnet and extending through said respective holes in said base means, a plurality of nuts threaded onto the outer ends of said respective studs to react inwardly on said base means and to react outwardly through said studs on said bonnet to force said seal tightening cam axially against said bonnet sealing ring to swell said bonnet sealing ring radially against said high pressure sealing surface on said body to produce a high intensity sealing engagement of said bonnet sealing ring with said sealing surface and a high intensity sealing engagement of said bonnet sealing ring with said bonnet which are intensified by the force of fluid pressure within said chamber acting outward on said bonnet; said base means and said bonnet being shaped and positioned in relation to each other to define therebetween, when said nuts are tightened on said studs, lubricant space through which said studs extend; a charge of lubricant disposed within said lubricant space in contact with medial portions of said studs to move outwardly along said studs through said base means to said nuts to provide lasting lubrication to mutually engaged threads on said nuts and said studs by capillary movement of the lubricant outwardly between threads on the studs and adjacent threads on said nuts, and means coacting with said base means to seal off said lubricant space from the external environment.

No references cited.

M. CARY NELSON, *Primary Examiner.*

J. R. DWELLE, *Assistant Examiner.*

U.S. Cl. X.R.

220—55; 137—246.23